United States Patent
Mai et al.

[11] Patent Number: 6,084,508
[45] Date of Patent: Jul. 4, 2000

[54] AUTOMATIC EMERGENCY BRAKING METHOD AND ARRANGEMENT

[75] Inventors: Rudolf Mai, Wolfsburg; Ralf Bergholz, Braunschweig; Ernst Lissel, Wolfsburg; Franciscus Van Meel, Böhmfeld, all of Germany

[73] Assignee: Volkswagen AG, Wolfsburg, Germany

[21] Appl. No.: 09/114,742

[22] Filed: Jul. 13, 1998

[30] Foreign Application Priority Data

Jul. 17, 1997 [DE] Germany .............................. 197 30 676
Sep. 4, 1997 [DE] Germany .............................. 197 38 611

[51] Int. Cl.[7] ........................................................ B60Q 1/22
[52] U.S. Cl. .......................... 340/463; 340/903; 340/435; 340/436; 701/301
[58] Field of Search ..................... 340/903, 435, 340/436; 180/169, 167, 275, 280; 701/30

[56] References Cited

U.S. PATENT DOCUMENTS

| | | | |
|---|---|---|---|
| 4,079,802 | 3/1978 | Kawata | 340/435 |
| 4,987,557 | 1/1991 | Masaki | 318/587 |
| 5,230,400 | 7/1993 | Kakinami et al. | 180/169 |
| 5,249,157 | 9/1993 | Taylor | 340/903 |
| 5,286,099 | 2/1994 | Fujita et al. | 303/103 |
| 5,332,057 | 7/1994 | Butsuen et al. | 180/169 |
| 5,357,438 | 10/1994 | Davidian | 340/436 X |
| 5,410,484 | 4/1995 | Kunimi et al. | 364/426 |
| 5,436,835 | 7/1995 | Emry | 364/426 |
| 5,447,363 | 9/1995 | Fukamachi | 303/125 |
| 5,461,357 | 10/1995 | Yoshioka et al. | 340/435 |
| 5,473,538 | 12/1995 | Fujita et al. | 364/424 |
| 5,541,590 | 7/1996 | Nishio | 340/903 |
| 5,585,798 | 12/1996 | Yoshioka et al. | 342/70 |
| 5,640,324 | 6/1997 | Inagaki | 364/426 |
| 5,680,123 | 10/1997 | Lee | 340/937 |
| 5,850,254 | 12/1998 | Takano et al. | 348/148 |

FOREIGN PATENT DOCUMENTS

| | | |
|---|---|---|
| 5625996 | of 0000 | Australia . |
| 0545437 | of 0000 | European Pat. Off. . |
| 582232 | of 0000 | European Pat. Off. . |
| 582236 | of 0000 | European Pat. Off. . |
| 19511210 | of 0000 | Germany . |
| 19647283 | of 0000 | Germany . |
| 2642211 | of 0000 | Germany . |
| 4101759 | of 0000 | Germany . |
| 4302541 | of 0000 | Germany . |

OTHER PUBLICATIONS

Japanese Abstract 5–270335.
Japanese Abstract 6–206527.

*Primary Examiner*—Daryl Pope
*Attorney, Agent, or Firm*—Baker Botts L.L.P.

[57] ABSTRACT

A method and arrangement for emergency braking of a vehicle includes a detection system on the vehicle which detects obstacles located in or near the direction of motion of the vehicle and generates corresponding data, sensors on the vehicle which generate data representing characteristic parameters of the condition of the vehicle, and an evaluating unit which determines, from the data on the obstacles and the parameters of the condition of the vehicle, target values for controlling the motion of the vehicle and, only upon determining that an impending collision of the vehicle with an obstacle is no longer avoidable by any action on the vehicle by steering or braking, triggers an automatic emergency braking for rapid deceleration of the vehicle.

29 Claims, 3 Drawing Sheets

AUTOMATIC EMERGENCY BRAKING METHOD AND ARRANGEMENT

BACKGROUND OF THE INVENTION

This invention relates to methods and arrangements for emergency braking of a vehicle utilizing an obstacle detection system and an evaluation unit.

To enhance the safety of a car and passengers in present-day road traffic, in addition to providing extravehicular traffic guidance systems, efforts are being made to support the operator in routine driving operations as well as in extraordinary situations using systems that intervene automatically in the control of the vehicle or of particular vehicle components.

A first step in this direction was the adoption of antilock braking systems (ABS) and antislip regulation (ASR) to enhance longitudinal vehicle stability in dynamically critical situations, i.e. in braking and accelerating processes.

In addition, use is made of so-called dynamic regulation (DR) and/or stability regulation (SR) to enhance transverse stability in dynamically critical situations, particularly, that is, in situations brought about and influenced by steering-wheel action taken by the operator. DR evaluates sensor data provided by suitable sensors from particular vehicle components or from the vehicle as a whole and correlates the data using special algorithms. In this way it is possible to recognize transverse dynamically critical situations and, by taking positive action with respect to individual parameters of vehicle dynamics, for example steering-wheel angle, speed and acceleration, to influence the vehicle positively with reference to the transverse dynamically critically situation. Here especially the traction between the tires and the roadway also plays an important part, since the transmission of force between the vehicle and the roadway during vehicle control actions depends directly upon the traction. However, DR acts blindly, so to speak, with reference to the environment of the vehicle, comprising, for example, the road condition and other moving vehicles in the vicinity. Thus DR alone cannot be employed to examine physically meaningful control actions affecting the motion of the vehicle to determine whether the control actions taken will result in meaningful maneuvers with respect to moving vehicles located in the vicinity or to the roadway conditions.

Other systems have been proposed that are intended to avoid collision of a vehicle with an obstacle by controlling acceleration or deceleration and/or by evasive maneuvers. Such systems, termed "collision avoidance systems" (CAS), are intended to guide the vehicle out of collision situations which are detected by sensors, a collision being prevented by a steering action which is not under the control of operator and consequently by steering maneuvers as well as accelerations and/or decelerations of the vehicle which are likewise executed and controlled independently of the operator. U.S. Pat. No. 5,541,590 discloses a neural network that, by evaluating environmental images detected by a CCD camera, continuously scans the surroundings for possible collisions and controls the vehicle speed and steering in response to additional signals representing the state of motion of the vehicle. Another arrangement is disclosed in U.S. Pat. No. 5,461,357 in which, by segmenting the road area to be monitored and incorporating information about the state of motion of the vehicle, rules are derived for avoiding a recognized obstacle by braking and steering operations. The main problem of these proposed systems is the complexity of CAS, which can function dependably only by using a highly developed sensory system in the vehicle and control strategies that also require knowledge, for example, of open escape routes in a given situation. Since evasion and acceleration strategies to be generated can be executed only when there is a maximum of plausible assurance that the reaction can take place without any additional safety risk to the operator and the vehicle, the complexity of design effort and reliability exceeds the limits of what can be accomplished by automotive technology at the present time.

In view of the complexity of CAS and the difficulties in its realization, a number of unitary systems have been proposed whereby individual CAS functions can be accomplished. A number of publications, for example, U.S. Pat. Nos. 5,410,784 and 5,447,363, disclose "automatic distance regulation" (ADR) systems whereby the spacing of a vehicle from other vehicles and/or stationary objects in the direction of vehicle motion can be detected and can be controlled by a controlled braking action. European Patent No. 0 545 437 discloses a method for avoiding collisions between motor vehicles whereby other vehicles located ahead of a vehicle can be detected and the driver can be warned by alarms against an unsafe approach. Since the vehicle having such a detection system is not yet at the minimum safe distance from a vehicle in front when the driver is warned, the driver can himself initiate appropriate braking action. When the distance is less than a minimum allowable distance, the vehicle will then brake automatically so as to maintain the required distance. U.S. Pat. No. 5,473,538 discloses an arrangement in which the behavior of the vehicle being controlled is included in the deceleration strategy so as to prevent unnecessary or even hazardous braking operations. A disadvantage of such systems is that the warning of a collision, or the correction of the motion of a vehicle, takes place consistently and, to a large extent, with no opportunity for the operator to exercise control. Because of the requirements of the regulating algorithm, a controlling action by such systems will take place quite early so that the action, for example braking of the vehicle, need not be executed too abruptly. Hence the system will respond even in situations that a more or less practiced operator would have negotiated himself with no problems. As a result, the operator will experience a repeated automatic intervention in the control of the vehicle, which is actually necessary in only a few cases from his point of view, and will consider such intervention as unwarranted interference so that such systems are unlikely to meet with much acceptance.

SUMMARY OF THE INVENTION

Accordingly, it is an object of the present invention to provide an automatic emergency braking method and arrangement which overcome the disadvantages of the prior art.

Another object of the invention is to provide a method and arrangement of this kind that will allow a vehicle driver a maximum of overriding decision in the avoidance of obstacles without sacrificing the advantages of a driver support system for collision limitation in the event of an actual collision situation.

These and other objects of the invention are attained by providing an automatic emergency braking method and arrangement in which automatic braking is initiated only when an impending collision can no longer be avoided by steering and/or braking action controlled by the vehicle operator.

It has been found in the analysis of accident statistics that a high proportion of all accidents involving collisions between vehicles and/or with the road environment are caused by human error, as a result of operating mistakes and conditioned by the physiological state of the operator. In such cases, the operator's ability to avoid a collision by positive maneuvers is limited. Furthermore, it is to be noted that, in a likewise very high percentage of collision accidents, there was little if any vehicle braking. At the same time, in a similar large number of collision accidents, it is found that the consequences would have been mitigated significantly by a reduction of the vehicle speed at the moment of impact.

The method of the invention therefore relies upon the fact that, owing to the complexity of possible collision situations, the operator of the vehicle should have an opportunity, as long as possible, to avoid the collision by braking and/or steering operations, or the like, to be performed by himself. Only when, because of the physical requirements resulting from the state of motion of the vehicle and the impending collision conditions, a collision is clearly no longer avoidable, will an automatically triggered and preferably maximal deceleration of the vehicle brake it so as to minimize the consequences of an accident to the operator and the vehicle.

For this purpose, in the method according to the invention, a detection system on the vehicle continuously detects obstacles which are in or near the direction of motion of the vehicle and provides corresponding data to an evaluating unit. In addition, the vehicle has, or certain of its components are provided with, sensors for detecting characteristic parameters of the condition or state of motion of the vehicle and transmitting data regarding these parameters to an evaluating unit. From the data reported concerning the obstacles and the vehicle's condition or motion parameters, the evaluating unit continuously calculates target parameters for influencing the motion of the vehicle. These target parameters, however, are not simply used to control the vehicle directly, but are analyzed to ascertain whether a conceivable collision with the obstacle or obstacles may yet be prevented even without these targets. If such is the case, the target parameters are disregarded for purposes of controlling the vehicle, and, as a result, the operator of the vehicle retains complete freedom to decide how to avoid the obstacle. Only when the impending collision ascertained by the evaluating unit is no longer avoidable by any conceivable rational steering and/or braking control of the vehicle will an automatic emergency braking to produce rapid deceleration of the vehicle be triggered. Consequently it is only in impending collision situations in which an operator, however experienced, can no longer avoid the collision by his own actions that care is taken to mitigate the consequences of accident automatically, and without possibly counterproductive actions of the driver, by virtue of the reduced vehicle velocity at the time of collision as a result of the automatic braking.

In another embodiment of the invention, the physical limits for a possible evasion of an obstacle, and hence for triggering of the emergency braking function, are determined for separate braking or steering maneuvers which may be performed by the operator and for combinations thereof, since an operator may react variously to an impending collision situation by either braking only or steering only, to avoid the obstacle. Again, as is taught in safety training, a driver may avoid an obstacle by various rational combinations of steering and braking actions, which may lead to quite different vehicle behaviors and consequently different evasion results. Advantageously, the time at which the automatic emergency braking function is triggered, according to the invention, will be determined by analysis of some or all of such evasive strategies, so that an emergency braking will be brought about only when none of the conceivable evasion strategies can succeed in avoiding a collision.

In a further embodiment according to the invention, the time of triggering the emergency braking to avoid a collision with the obstacle by braking alone, from which time a collision is physically no longer avoidable, is determined so that, at the time of triggering, the necessary stopping distance just exceeds the current distance between the obstacle and the vehicle, essentially in the direction of vehicle motion. This triggering time can be calculated from physical parameters to determine the stopping distance in a conventional manner with which those skilled in the art are familiar, and need not be further explained here. Then it is only necessary to compare the stopping distance with the distance from the obstacle as determined by the detection system.

In another embodiment according to the invention, in which avoidance of the obstacle may be effected by steering actions alone, the time after which a collision is physically no longer avoidable is determined so that, in the state of motion of the vehicle as measured by the sensors on the vehicle, the necessary evasion radius to circumvent the obstacle is less than an evasion radius calculated from the state of motion of the vehicle. Preferably, the evasion radius is calculate in each situation using the well known "Kamm" circle, which is a conventional method of calculation with which those skilled in the art are familiar and which therefore need not be explained here.

It is especially advantageous to incorporate in the calculation of the state of the vehicle, on the currently determined force coefficient of force transmission, i.e. the traction, between the vehicle tires and the roadway, based on data from the sensors on the vehicle and the readings obtained by them, making allowance also for a change in frictional conditions during the motion of the vehicle, thus improving the action of the emergency braking process or its point of initiation. By targeted control of the deceleration in this way, a maximum possible reduction of speed can be achieved in accordance with the road conditions.

The automatic braking should take place with maximum brake pressure to achieve an especially great reduction of velocity in the emergency situation since this residual velocity at the time of impact is a direct measure of the impact energy, and hence of the stress on the occupants. In one embodiment, the deceleration produced by automatic braking continues until the vehicle is stationary.

It is particularly advantageous if, once the emergency braking function has responded, the deceleration takes place independently of steering and/or braking actions by the operator, since, owing to the strict response criteria of automatic emergency braking, a collision is no longer avoidable and any action taken by the operator might cancel out some of the emergency braking effect. Full braking with maximum deceleration, possibly accompanied by operation of an antilock braking system and/or a dynamic control system, will normally achieve the greatest mitigation of accident consequences.

In a further embodiment, after recognition of a critical obstacle and before triggering of the emergency braking function, the detection system continuously detects a recognized collision obstacle in order to detect even minor changes in the collision situation as surely and timely as possible and incorporates such changes in the data used to make a decision as to triggering the emergency braking systems. Furthermore, if a collision with the critical obstacle is no longer avoidable, any additional obstacles which are less critical in terms of their probability of collision may then be neglected with regard to triggering the emergency braking function. Further observation of the other possible obstacles in such cases only require unneeded capacity of the detection and evaluating means.

The emergency braking method is employed to especial advantage at low to medium speeds of the vehicle, preferably at speeds below 120 km/hour, since it is known from analysis of accident data that above about 100–120 km/hr only a few collision accidents occur, and when they do, the consequences are so severe that optimal braking would not effect any substantial mitigation of the consequences.

The arrangement for carrying out the method of automatic emergency braking according to the invention includes a brake system which is freely actualable independently of operation by the driver. This brake system is completely decoupled from the control of the operator after emergency braking has been triggered, so that the maximum possible reduction in speed may be automatically achieved. For this purpose, the brake system, in addition to producing high attainable braking effects, exhibits a low response lag, so that actuation of the brake produces vehicle deceleration immediately. It is especially advantageous if the arrangement includes an antilock braking system and/or an electronic locking hindrance and/or a dynamic control, since in that case the motion of the vehicle will be more controllable even during braking and under critical road conditions. Since such systems are now standard equipment in many vehicles, the arrangement for automatic emergency braking may advantageously be combined with or integrated into such conventional systems.

The arrangement for detecting the motion condition of the vehicle includes sensors for detecting the steering angle, vehicle speed and/or vehicle angle of yaw, in order to be able to detect the instantaneous vehicle situation and its changes. The sensors contained in antilock braking systems or dynamic regulators may be employed for this purpose at the same time if desired.

It is of special advantage if the arrangement includes sensors and an evaluating unit to determine the coefficient of force transmission, i.e., the traction, between the roadway and the vehicle tires, so that the prevailing road conditions can be detected. In this way, readings for maximum possible deceleration can be so derived, which may be subject to continual variations even during the braking operation, for example if the roadway is wet or slippery.

As sensors for detection of the surroundings, preferably conventional radar or laser sensors, whose application is familiar to those skilled in the art, are used. However, any other types of sensors that permit an adequate preview of the range of motion of the vehicle and which are suitable for service under rough vehicle conditions may be used.

In another advantageous embodiment of the invention, the environmental data provided by the obstacle detection system and/or the signals furnished by sensors in the vehicle are stored in a memory unit. This has the advantage that the parameters leading to triggering of the automatic emergency braking function are available for subsequent analysis and is especially desirable to the manufacturer of the motor vehicle for reasons of product liability analysis.

In a further advantageous embodiment of the invention a camera, preferably mounted in the region of the inside rear view mirror of the vehicle is provided so that an accident event can be observed visually and the video signal generated by the camera can be stored in the memory. Providing such a camera has the advantage that an accident event can be analyzed from the point of view of the driver and subsequently evaluated.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENT

Figure 1:
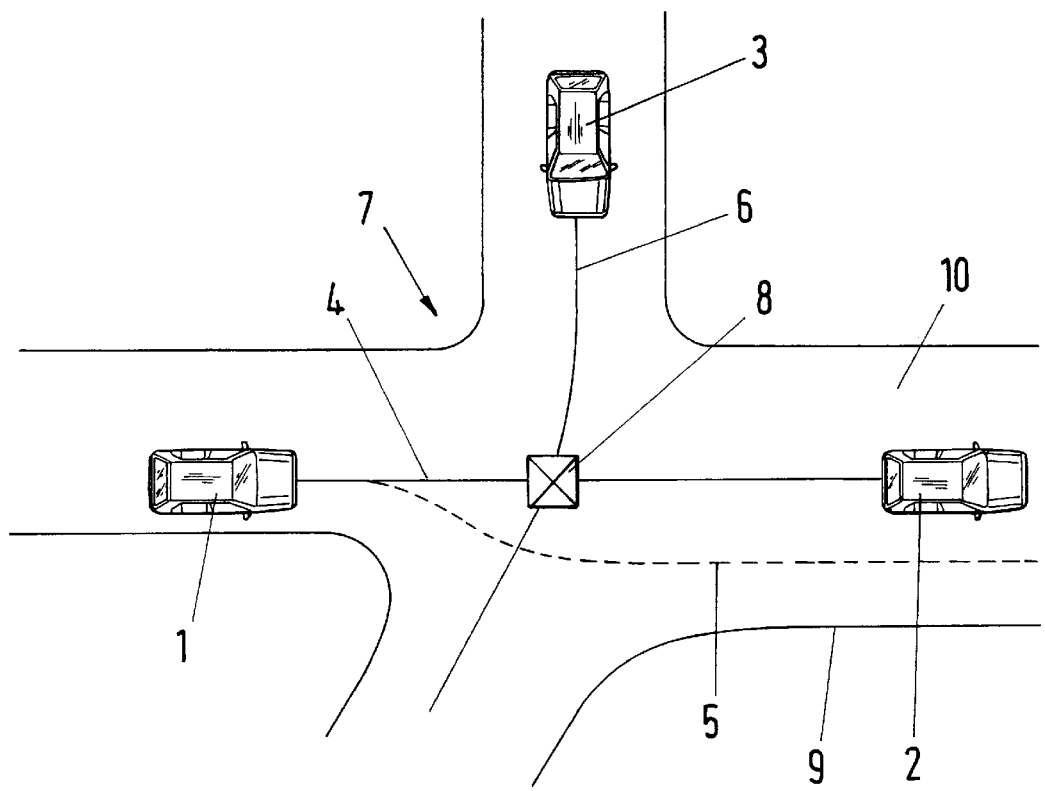
FIG. 1 is a plan view showing a potential accident situation at an intersection including a stationary vehicle and a crossing vehicle.

FIG. 1 shows a typical potential accident situation in the vicinity of an intersection in which a moving vehicle 1 is in danger of a collision with a stationary vehicle 2 located beyond the intersection 7 and also with a crossing vehicle 3. The stationary vehicle 2 can still be avoided by the driver of the vehicle 1, because of the distance between them, by steering along an evasion path 5 without causing a collision. There is still enough room for the vehicle 1 to pass between the stationary vehicle 2 and the edge 9 of the roadway.

Respecting the crossing vehicle 3, however, the operator of the vehicle 1 cannot escape, no matter whether he continues along his original direction of progress 4 or along the evasion path 5. Depending on the relative velocities of the vehicle 1 and the vehicle 3, a collision will occur in the neighborhood of the point 8, an approximate point of intersection of the direction of motion 4 of the vehicle 1 and the direction of motion 9 of the vehicle 3. In this situation, the automatic emergency braking arrangement of the invention is of great importance because it can minimize injury to the vehicles and passengers if, for example, the vehicle 1 is equipped with such a function and is braked automatically with the maximum possible deceleration.

Figure 2:
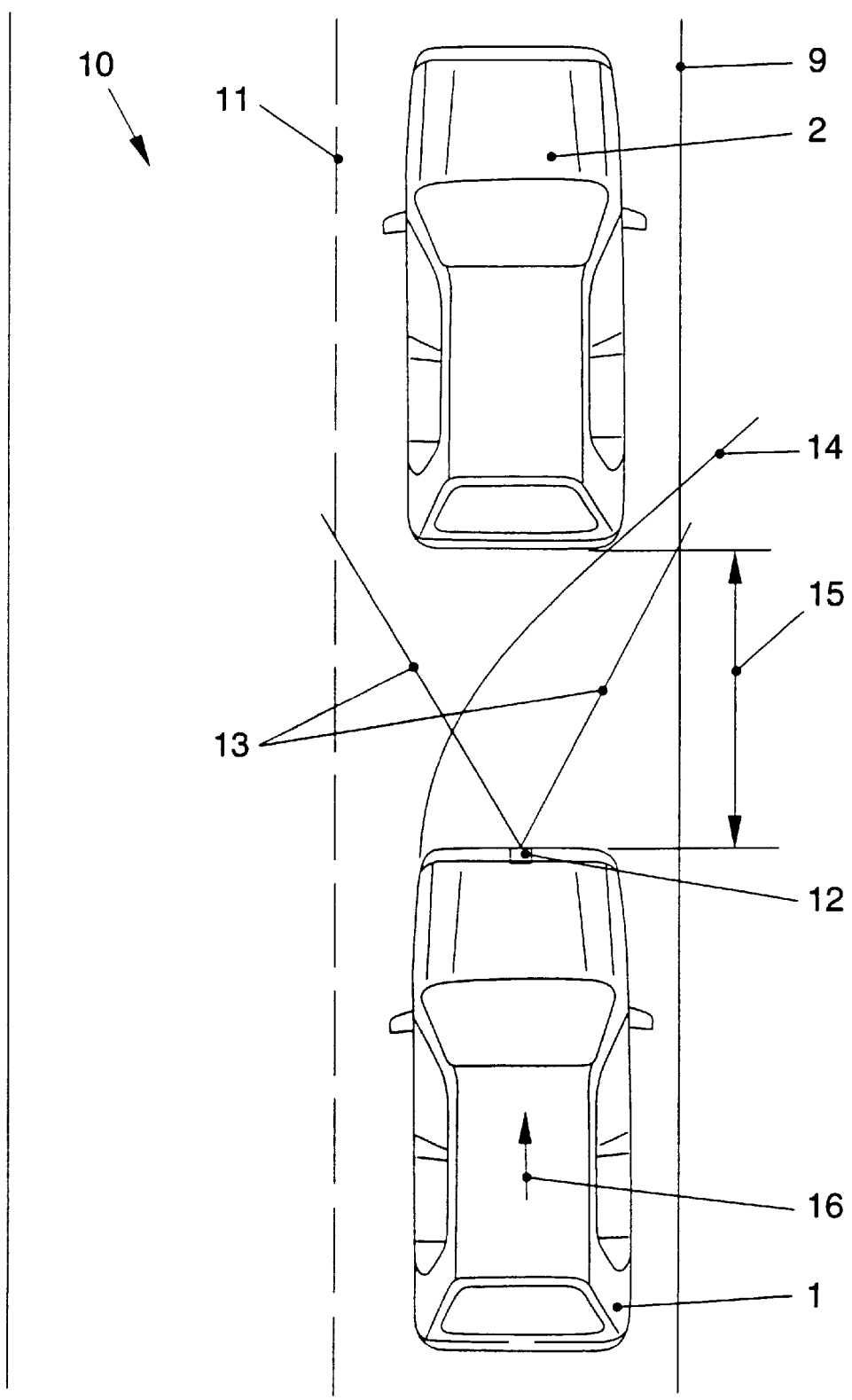
FIG. 2 is a plan view showing a potential impact situation on a straightaway.

FIG. 2 shows a typical impact situation on a straightaway 10, in which the vehicle 1, moving at an initial velocity in the direction of the arrow 16, is approaching a stationary vehicle 2 from behind. In the front portion of the vehicle 1, a detection unit 12 which is shown schematically, scans the roadway 10 for obstacles within an angular field 13. In this case, the stationary vehicle 2 is located inside the field 13 and the moving vehicle 1 is spaced at a distance 15 behind the stationary vehicle 2.

If the operator of the vehicle 1 recognizes the obstacle represented by the vehicle 2 in time, he can ensure, by braking and/or steering, that his vehicle 1 will avoid the vehicle 2 either by stopping with the space 15 or by moving along an indicated evasion path 14. The evasion path 14 shown in FIG. 2 is supposed to represent the limiting case of an evasion maneuver in which the vehicle 1 can just miss the vehicle 2 by turning. Depending on the speed of the vehicle 1 in the direction of the arrow 16 and on the roadway condition and other parameters concerning the vehicle 1, and depending also on the distance 15, the vehicle 1 can either brake in time sufficiently to be steered around the vehicle 2, or else a collision can no longer be avoided by any conceivable steering and braking action. In the latter case, on the basis of evaluation of the data from the detection system 12 and from sensors (not shown) on the vehicle 1, this situation will be recognized by an evaluating unit 20 (shown in FIG. 3) and the automatic emergency braking initiated.

Figure 3:
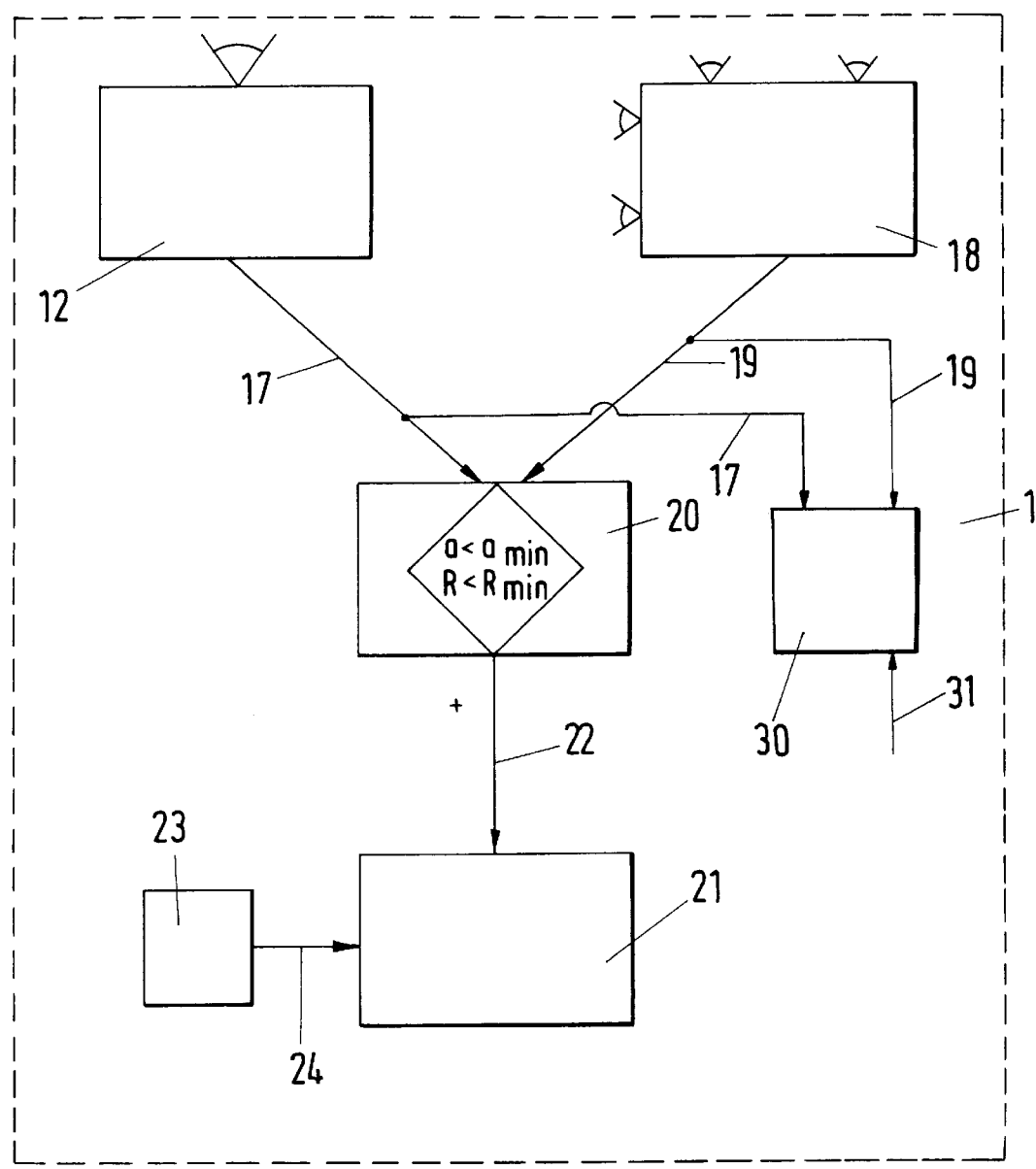
FIG. 3 is a schematic block diagram showing the arrangement of a representative embodiment of an automatic emergency braking system according to the invention.

FIG. 3 is a schematic diagram showing an arrangement for making a decision as to triggering the automatic emergency braking function as it might take place in a typical embodiment of the invention. For this purpose, environmental data 17 furnished by the detection unit 12 and the signals 19 from various sensors 18 arranged inside the vehicle are supplied to the evaluating unit 20. In the simplest case, these data are utilized for the determination of a minimum stopping distance $a=a_{min}$. In additional or alternative evaluation steps, the evasion radius R can be determined as well. If both criteria are transgressed, i.e., the distance 15 is less than $a_{min}$ and the evasion radius R is greater than a minimum radius, a trigger signal 22 is transmitted to a deceleration control unit 21, which first overrides any control signals from the driver's brake pedal 23 and second produces maximum deceleration by maximal actuation of the brake system. This condition continues until the vehicle 1 comes to a stop. On the other hand, if there is no transgression of one or more limits, no trigger signal 22 is given and it is possible for the driver to avoid the obstacle solely by control signals 24 from his brake 23 and/or from steering action (not shown), without being affected or interfered with in any way.

Preferably, provision is made so that the environmental data 17 furnished by the detection unit 12 and/or the signals 19 from the various sensors 18 arranged inside the vehicle are stored in a memory 30. This has the advantage that, in the event of a collision that was not avoidable even by the automatic emergency braking function, the environmental data 17 and sensor signals 19 correlated with this accident are available for subsequent analysis. Such knowledge of the environmental data 17 and sensor signals 19 preceding the automatic emergency braking and/or a collision is not only of advantage for a traffic investigation of the accident event but also to provide accurate knowledge of the parameters that led to the triggering of the automatic emergency braking function, which is of significance in view of the potential product liability of the motor vehicle manufacturer and/or the manufacturer of the emergency braking device of a vehicle.

Preferably, the memory 30 is a memory that retains data for only a certain period of time, i.e., only the data received within a certain time interval prior to triggering of the automatic emergency braking function will be stored, whereas the data 17 and 19 received prior to that time interval are cleared. Preferably a cyclical memory unit is used. The storage of the environmental data 17 furnished by the detection unit 12 and/or the signals 19 from the sensors 18 arranged inside the vehicle as described above advantageously permits a substantially complete understanding of all criteria that led to the triggering of the automatic emergency braking function. However, this procedure is comparatively costly because of the quantity of data involved.

Therefore, as an alternative to the storage of the environmental data 17 furnished by the detection unit 12 and/or the signals 19 of the sensors 18 as described above, a less comprehensive detection of the accident event preceding the triggering of the automatic emergency braking function can be provided by a camera (not shown) positioned to detect the traffic situation in the direction of vehicle motion, and the corresponding video signal 31 is stored in the memory 30. In this case, it is preferred that this camera, not shown in the figure, is located in the region of the inside rear view mirror of the motor vehicle, so that the video signal 31 from the camera recorded in the memory 30 represents the accident event essentially from the point of view of the driver of the vehicle.

It is also possible to record the video signal 31 from the camera in addition to the environmental data 17 and/or the sensor signals 19, in order to supplement the data delivered by the detection unit 12 and the sensors 18 with a visual representation of the accident event.

Preferably, a time code associated with the environmental data 17 furnished by the detection unit 12 and/or the signals 19 from the sensors 18 and/or the video signal 31 of the camera means is also stored in the memory 30. This has the advantage that the time sequence of the traffic or accident event is readily ascertainable in a subsequent evaluation of the data 17, 19 and 31 stored in the memory 30.

Advantageously, the control unit, and in particular the storage unit 30, includes a synchronizing unit to synchronize the environmental data 17 of the detection unit 12 and/or the signals 19 of the sensors 18 and/or the video signal 31 of the camera, so as to be in a position, upon subsequent evaluation, to correlate the environmental data 17, sensor signals 19, and video signal 31 with respect to their time sequence, stemming as they do from substantially mutually independent sources, i.e., the detection unit 12, the sensors 18 and the camera. Preferably the time code described above is employed for this purpose.

Although the invention has been described herein with reference to specific embodiments, many modifications and variations therein will readily occur to those skilled in the art. Accordingly, all such variations and modifications are included within the intended scope of the invention.

We claim:

1. A method for emergency braking of a vehicle having a detection system which detects obstacles located in or near the direction of motion of the vehicle and sensors which provide characteristic parameters of the condition of the vehicle and an evaluating unit which determines target quantities for controlling the motion of the vehicle from data concerning the obstacles and the parameters of vehicle condition and an automatic emergency braking system comprising determining in the evaluation unit a situation in which an impending collision of the vehicle with an obstacle can no longer be avoided by any steering and/or braking action of the vehicle and triggering the automatic emergency braking system to produce rapid deceleration of the vehicle only after the evaluating unit has determined that an impending collision of the vehicle with an obstacle can no longer be avoided by any steering and/or braking action of the vehicle to minimize the effect of the collision, wherein the automatic emergency braking system is not triggered by a situation in which a collision is possible but still avoidable as determined by the evaluation unit.

2. A method according to claim 1 wherein the physical limits of possible evasion of an obstacle, and hence the triggering of the emergency braking function, are determined by braking and/or steering actions that can be performed by a vehicle operator.

3. A method according to claim 2 wherein the time after which a collision with an obstacle is no longer avoidable occurs when a required vehicle stopping distance is greater than the distance of the vehicle from the obstacle substantially in the direction of vehicle motion.

4. A method according to claim 2 wherein the time after which a collision is physically no longer avoidable by circumventing an obstacle occurs when an evasion radius required to circumvent the obstacle is smaller than an evasion radius determined from the state of motion of the vehicle.

5. A method according to claim 4 wherein the calculation of the evasion radius is carried out using the "Kamm" circle.

6. A method according to claim 1 wherein the determination of the state of the vehicle on the basis of the parameters from sensors on the vehicle includes a currently determined traction between tires of the vehicle and the roadway.

7. A method according to claim 1 wherein the deceleration of the vehicle is effected by brakes.

8. A method according to claim 7 wherein the braking is effected at maximum brake pressure.

9. A method according to claim 7 wherein deceleration of the vehicle is continued to standstill of the vehicle.

10. A method according to claim 1 wherein the deceleration of the vehicle is effected after response of the emergency braking function independently of steering and/or braking actions on the part of the operator.

11. A method according to claim 1 wherein, after recognition of a critical obstacle and before triggering of the emergency braking function, the detection system continuously detects the collision obstacle.

12. A method according to claim 1 including storing in a memory environmental data furnished by the detection unit and/or signals generated by sensors in the vehicle.

13. A method according to claim 1 including using a camera to make a visual record of traffic events, and storing the corresponding video signal generated by the camera in a memory.

14. A method according to claim 1 including storing in a memory data which were acquired within a selected time interval prior to triggering of the automatic emergency braking system.

15. A method according to claim 1 including storing a timing signal in a memory in which environmental data furnished by the detection unit and/or the signals delivered by sensors and/or a video signal from a camera is stored.

16. A method according to claim 1 where the environmental data furnished by the detection unit and/or the signals from the sensors and/or a video signal from a camera are synchronized.

17. A method according to claim 16 wherein a timing signal is used to synchronize the data.

18. An arrangement for emergency braking of a vehicle comprising a detection system which detects obstacles located in or near the direction of motion of the vehicle, sensors which provide characteristic parameters of the condition of the vehicle, an evaluating unit which determines target quantities for controlling the motion of the vehicle from data concerning the obstacles and the parameters of vehicle condition and determining when a collision with an obstacle can no longer be avoided by any steering and/or braking action of the vehicle, and an automatic emergency braking system arranged to be triggered only after the evaluation unit has determined that an obstacle can no longer be avoided by any steering and/or braking action of the vehicle to minimize the effect of the collision, wherein the automatic emergency braking system is not triggered by a situation in which a collision is possible but still avoidable as determined by the evaluation unit.

19. An arrangement according to claim 18, wherein the automatic braking system is actuable independently of action by a vehicle operator.

20. An arrangement according to claim 19 wherein the automatic emergency braking system has a short response time.

21. An arrangement according to claim 18 including at least one of an antilocking braking system, an electronic locking hindrance and a dynamic regulation system.

22. An arrangement according to claim 18 wherein the sensors include sensors for detecting at least one of steering angle, vehicle speed and vehicle angle of yaw.

23. An arrangement according to claim 18 wherein the sensors and the evaluation unit determine the traction between roadway and the vehicle tires.

24. An arrangement according to claim 18 wherein the sensors include at least one of a radar sensor and a laser sensor.

25. An arrangement according to claim 18 including a memory for storing at least one of data furnished by the detection system and signals generated by sensors.

26. An arrangement according to claim 25 including camera means providing a video signal which is storable in memory.

27. A arrangement according to claim 25 wherein the memory is a cyclical memory.

28. An arrangement according to claim 25 wherein a time code is stored in the memory.

29. An arrangement according to claim 26 including a synchronizing unit to synchronize at least one of data from the detection system, signals from the sensors and the video signal from the camera means.

* * * * *